(12) United States Patent
Hwang et al.

(10) Patent No.: US 11,743,224 B2
(45) Date of Patent: *Aug. 29, 2023

(54) METHOD, COMPUTER DEVICE, AND NON-TRANSITORY COMPUTER READABLE RECORD MEDIUM TO DISPLAY CONTENT OF INTEREST

(71) Applicant: LINE Plus Corporation, Seongnam-si (KR)

(72) Inventors: Min Hwang, Seongnam-si (KR); Sangmo Goo, Seongnam-si (KR); Jihun Im, Seongnam-si (KR); Jay Lee, Seongnam-si (KR); Yeon Jin Jin, Seongnam-si (KR); Yubin Kim, Seongnam-si (KR)

(73) Assignee: LINE Plus Corporation, Seongnam-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/992,303

(22) Filed: Nov. 22, 2022

(65) Prior Publication Data

US 2023/0083136 A1    Mar. 16, 2023

Related U.S. Application Data

(63) Continuation of application No. 17/577,847, filed on Jan. 18, 2022, now Pat. No. 11,546,286.

(30) Foreign Application Priority Data

Jan. 19, 2021    (KR) ........................ 10-2021-0007542

(51) Int. Cl.
*H04L 51/52*    (2022.01)
*H04L 51/10*    (2022.01)
*H04L 51/046*    (2022.01)
*H04L 51/42*    (2022.01)

(52) U.S. Cl.
CPC ............ *H04L 51/52* (2022.05); *H04L 51/046* (2013.01); *H04L 51/10* (2013.01); *H04L 51/42* (2022.05)

(58) Field of Classification Search
CPC ....... H04L 51/52; H04L 51/42; H04L 51/046; H04L 51/10
See application file for complete search history.

(56) References Cited

U.S. PATENT DOCUMENTS

| | | | |
|---|---|---|---|
| 6,542,515 B1 | 4/2003 | Kumar et al. | |
| 7,533,345 B2 | 5/2009 | Krebs | |
| 11,388,124 B2 * | 7/2022 | Lee .................... | G06F 16/9536 |
| 2002/0120547 A1 | 8/2002 | Zajac | |
| 2003/0041000 A1 | 2/2003 | Zajac et al. | |

(Continued)

FOREIGN PATENT DOCUMENTS

KR    10-2002-0074304 A    9/2002

*Primary Examiner* — Sargon N Nano
(74) *Attorney, Agent, or Firm* — Sughrue Mion, PLLC

(57) ABSTRACT

A method, a system, and a non-transitory computer-readable record medium are provided to display content of interest. A content display method may include analyzing a user interest based on a user activity on an application; generating a customized content in response to receiving from a server, information that matches the user interest; and displaying the customized content through an interface related to a specific event when the specific event occurs on the application.

16 Claims, 11 Drawing Sheets

(56) References Cited

U.S. PATENT DOCUMENTS

| | | |
|---|---|---|
| 2003/0041142 A1 | 2/2003 | Zhang et al. |
| 2009/0006550 A1* | 1/2009 | Singh ............... G06Q 30/02 |
| | | 709/204 |
| 2012/0124363 A1* | 5/2012 | Dietrich ............ G06F 11/3466 |
| | | 713/100 |
| 2014/0162234 A1 | 6/2014 | Ukelson |
| 2016/0330150 A1 | 11/2016 | Joe et al. |
| 2018/0189408 A1* | 7/2018 | O'Driscoll ............ H04L 51/02 |
| 2019/0268298 A1* | 8/2019 | Kim ..................... H04L 51/226 |
| 2019/0324620 A1* | 10/2019 | Gu ........................ G06F 3/14 |
| 2021/0211399 A1* | 7/2021 | Kim ..................... H04L 51/56 |
| 2021/0297371 A1* | 9/2021 | Lee ..................... G06F 16/9536 |

* cited by examiner

METHOD, COMPUTER DEVICE, AND NON-TRANSITORY COMPUTER READABLE RECORD MEDIUM TO DISPLAY CONTENT OF INTEREST

CROSS-REFERENCE TO RELATED APPLICATIONS

This application is a continuation application of U.S. application Ser. No. 17/577,847, filed Jan. 18, 2022, which claims priority from Korean Patent Application No. 10-2021-0007542, filed Jan. 19, 2021 in the Korean Intellectual Property Office (KIPO), the disclosures of which are incorporated herein by reference in their entireties.

BACKGROUND

1. Field

Apparatuses and methods consistent with example embodiments relate to recommending content based on analysis of a user's interest.

2. Description of Related Art

An instant messenger that is a general community tool may send and receive messages or data in real time and allow a user to register a contact on a messenger and to send and receive messages with a counterpart included in a contact list.

Such a messenger function allows the use of a messenger to be popular not only in a personal computer (PC) environment but also in a mobile environment of a mobile communication terminal.

For example, a mobile messenger service system and method of a portable terminal using a wireless communication network may provide a messenger service between mobile messengers installed on portable terminals.

As the use of an instant messenger becomes popular and a function provided through an instant messenger becomes more diverse, a function of sharing content and a variety of information, such as a photo, a video, a file, a contact, a location, a schedule, a notice, and a vote, and an interaction with another service, such as a game service and a video service, are supported.

SUMMARY

One or more example embodiment provides a method and an apparatus for displaying customized content according to an interest at an occurrence point in time of a specific event in association with a community application.

Further, one or more example embodiment provides a method and an apparatus for customizing a startup screen of a community application according to a user interest.

Still further, one or more example embodiment provides a method and an apparatus for displaying a customized content according to a user interest when an activity in a community meets a specific condition.

According to an aspect of an example embodiment, there is provided a content display method implemented by a computer system including at least one processor configured to execute computer-readable instructions included in a memory, the content display method including: analyzing a user interest based on a user activity on an application; generating a customized content in response to receiving from a server, information that matches the user interest; and displaying the customized content through an interface related to a specific event when the specific event occurs on the application.

The content display method may include: displaying the customized content on a launch screen of the application when the application starts to run.

The displaying may include: displaying the customized content through a chatroom of the application when the user activity in the chatroom meets a specific condition.

The displaying may include: displaying the customized content through a chatroom of the application when a user enters the chatroom with no unread messages.

The displaying may include: displaying the customized content through a chatroom of the application when a user stays for a predetermined period of time or longer without sending a message in the chatroom.

The displaying may include: when a user enters a chatroom among a plurality of chatrooms that exist on the application, displaying the customized content through the chatroom based on the chatroom being entered by the user immediately after the application is started and being a last chatroom in which the user stayed immediately before a previous termination of the application.

The displaying may include: displaying the customized content through a specific chatroom, among a plurality of chatrooms of the application, when a predetermined type of activity is detected or the predetermined type of activity occurs at a predetermined rate or higher.

The displaying may include: in response to receiving a message including a keyword related to the user interest through a chatroom of the application, displaying an interface for receiving a selection input in association with the message; and displaying the customized content through the chatroom when a user selects the interface.

The displaying may include: displaying an interface for receiving a selection input in association with a content, in response to the content shared through a chatroom of the application matching the user interest; and displaying the customized content through the chatroom when a user selects the interface.

The generating the customized content may include: receiving, from the server, data that includes content provider information or content information corresponding to the user interest; and generating the customized content in a chatroom message format of the application using the data.

According to an aspect of another example embodiment, there is provided a non-transitory computer-readable record medium storing instructions that, when executed by a processor, cause the processor to perform a content display method. The content display method may include: analyzing a user interest based on a user activity on an application; generating a customized content in response to receiving from a server, information that matches the user interest; and displaying the customized content through an interface related to a specific event when the specific event occurs on the application.

According to an aspect of another example embodiment, there is provided a computer system including: a memory storing one or more computer-readable instructions; and at least one processor configured to execute the computer-readable instructions to: analyze a user interest based on a user activity on an application; generate a customized content in response to receiving from a server, information that matches the user interest; and display the customized content through an interface related to a specific event when the specific event occurs on the application.

The at least one processor may be further configured to display the customized content on a launch screen of the application when the application starts to run.

The at least one processor may be further configured to display the customized content through a chatroom of the application when the user activity in the chatroom meets a specific condition.

The at least one processor may be further configured to display the customized content through a chatroom of the application when a user enters the chatroom with no unread messages.

The at least one processor may be further configured to display the customized content through a chatroom of the application when a user stays for a predetermined period of time or longer without sending a message in the chatroom.

The at least one processor may be further configured to, when a user enters a chatroom among a plurality of chatrooms that exist on the application, display the customized content through the chatroom of the application based on the chatroom being entered by the user immediately after the application is started, and being a last chatroom in which the user stayed immediately before a previous termination of the application.

The at least one processor may be further configured to display the customized content through a specific chatroom, among a plurality of chatrooms of the application, when a predetermined type of activity is detected or the predetermined type of activity occurs at a predetermined rate or higher.

The at least one processor may be further configured to, in response to receiving a message including a keyword related to the user interest through a chatroom of the application, display an interface for receiving a selection input in association with the message, and display the customized content through the chatroom when a user selects the interface.

The at least one processor may be further configured to display an interface for receiving a selection input in association with a content, in response to the content shared through a chatroom of the application matching the user interest, and display the customized content through the chatroom when a user selects the interface.

BRIEF DESCRIPTION OF THE DRAWINGS

The above and/or other aspects will be more apparent by describing certain example embodiments, with reference to the accompanying drawings, in which.

DETAILED DESCRIPTION

Figure 1:
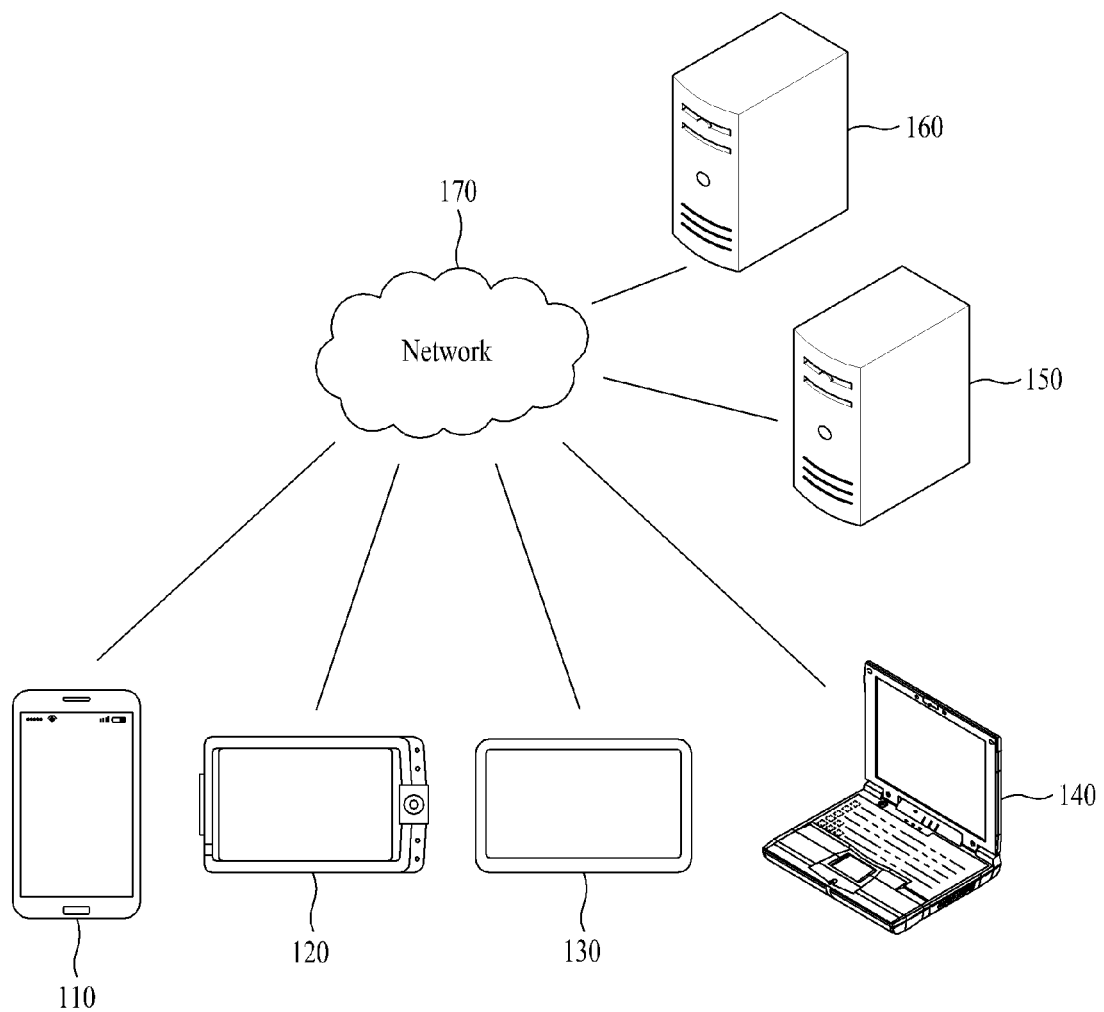
FIG. 1 is a diagram illustrating an example of a network environment according to at least one example embodiment.

Example embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the example embodiments. However, it is apparent that the example embodiments can be practiced without those specifically defined matters. Also, well-known functions or constructions are not described in detail since they would obscure the description with unnecessary detail.

One or more example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed products. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, all of a, b, and c, or any variations of the aforementioned examples. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particular manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more example embodiments may be implemented using hardware and/or a combination of hardware and software. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor), Central Processing Unit (CPU), a controller, an arithmetic logic unit (ALU), a digital signal processor, a microcomputer, a microprocessor, etc., the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer record medium or device, capable of providing instructions or data to, or being interpreted by, a hardware device. The software also may be distributed over network coupled computer systems so that the software is stored and executed in a distributed fashion. In particular, for example, software and data may be stored by one or more computer readable record mediums, including the tangible or non-transitory computer-readable storage media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive, solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable record medium into the one or more storage devices and/or one or more computer processing devices using a drive mechanism. Such separate computer readable record medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable record medium. Additionally, the computer programs, program code, instructions, or some combination thereof, may be loaded into the one or more storage devices and/or the one or more processors from a remote computing system that is configured to forward and/or distribute the computer programs, program code, instructions, or some combination thereof, over a network. The remote computing system may forward and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, example embodiments will be described with reference to the accompanying drawings.

The example embodiments relate to technology for recommending content.

The example embodiments including the disclosures described herein may display customized content according to an interest at an occurrence point in time of a specific event in association with an application and, through this, may achieve many advantages in various aspects, such as information recommendation performance and improvement in quality of service (QoS).

FIG. 1 illustrates an example of a network environment according to at least one example embodiment. Referring to FIG. 1, the network environment may include a plurality of electronic devices 110, 120, 130, and 140, a plurality of servers 150 and 160, and a network 170. FIG. 1 is provided as an example only. A number of electronic devices or a number of servers is not limited thereto.

Each of the plurality of electronic devices 110, 120, 130, and 140 may be a fixed terminal or a mobile terminal that is configured as a computer system. For example, the plurality of electronic devices 110, 120, 130, and 140 may be a smartphone, a mobile phone, a navigation device, a computer, a laptop computer, a digital broadcasting terminal, a personal digital assistant (PDA), a portable multimedia player (PMP), a tablet PC, a game console, a wearable device, an Internet of things (IoT) device, a virtual reality (VR) device, an augmented reality (AR) device, and the like. For example, although FIG. 1 illustrates a shape of a smartphone as an example of the electronic device 110, the electronic device 110 used herein may refer to one of various types of physical computer systems capable of communicating with other electronic devices 120, 130, and 140, and/or the servers 150 and 160 over the network 170 in a wireless or wired communication manner.

The communication scheme is not limited and may include a near field wireless communication scheme between devices as well as a communication scheme using a communication network (e.g., a mobile communication network, wired Internet, wireless Internet, a broadcasting network, a satellite network, etc.) includable in the network 170. For example, the network 170 may include at least one of network topologies that include a personal area network (PAN), a local area network (LAN), a campus area network (CAN), a metropolitan area network (MAN), a wide area network (WAN), a broadband network (BBN), and the Internet. Also, the network 170 may include at least one of network topologies that include a bus network, a star network, a ring network, a mesh network, a star-bus network, a tree or hierarchical network, and the like. However, they are provided as examples only.

Each of the servers 150 and 160 may be configured as a computer apparatus or a plurality of computer apparatuses that provides an instruction, a code, a file, content, a service, etc., through communication with the plurality of electronic devices 110, 120, 130, and 140 over the network 170. For example, the server 150 may be a system that provides a first service to the plurality of electronic devices 110, 120, 130, and 140 connected over the network 170. The server 160 may be a system that provides a second service to the plurality of electronic devices 110, 120, 130, and 140 connected over the network 170. In detail, for example, the server 150 may provide, as the first service, a service (e.g., a community service) intended by an application through the application as a computer program installed and executed on the plurality of electronic devices 110, 120, 130, and 140. As another example, the server 160 may provide, as the second service, a service that distributes a file for installing and executing the application to the plurality of electronic devices 110, 120, 130, and 140.

Figure 2:
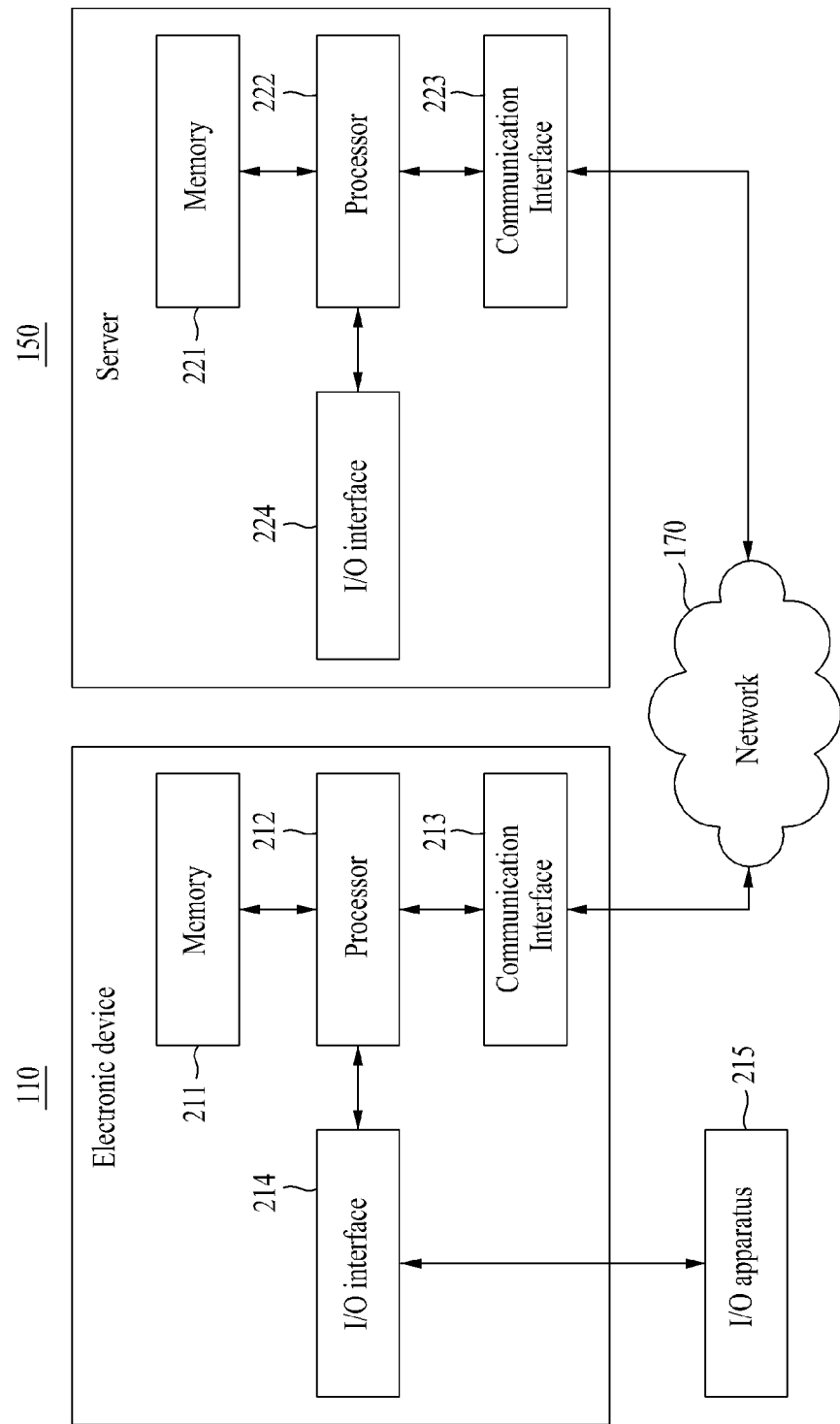
FIG. 2 is a diagram illustrating an example of an electronic device and a server according to at least one example embodiment.

FIG. 2 is a block diagram illustrating an example of an electronic device and a server according to at least one example embodiment. Description is made using the electronic device 110 as an example of an electronic device and the server 150 as an example of a server with reference to FIG. 2. Also, the other electronic devices 120, 130, and 140 or the server 160 may have the same or similar configuration as that of the electronic device 110 or the server 150.

Referring to FIG. 2, the electronic device 110 may include a memory 211, a processor 212, a communication interface 213, and an input/output (I/O) interface 214, and the server 150 may include a memory 221, a processor 222, a communication interface 223, and an I/O interface 224.

The memory 211, 221 may include a permanent mass storage device, such as a random access memory (RAM), a read only memory (ROM), a disk drive, a solid state drive (SSD), a flash memory, etc., as a non-transitory computer-readable record medium. The permanent mass storage device, such as ROM, SSD, flash memory, and disk drive, may be included in the electronic device 110 or the server 150 as a permanent storage device separate from the memory 211, 221. Also, an OS and at least one program code, for example, a code for a browser installed and executed on the electronic device 110 or an application installed and executed on the electronic device 110 to provide a specific service, may be stored in the memory 211, 221. Such software components may be loaded from another non-transitory computer-readable record medium separate from the memory 211, 221. The other non-transitory computer-readable record medium may include a non-transitory computer-readable record medium, for example, a floppy drive, a disk, a tape, a DVD/CD-ROM drive, a memory card, etc. According to other example embodiments, software components may be loaded to the memory 211, 221 through the communication interface 213, 223, instead of the non-transitory computer-readable record medium. For example, at least one program may be loaded to the memory 211, 221 based on a computer program, for example, the application, installed by files provided over the network 170 from developers or a file distribution system, for example, the server 160, providing an installation file of the application.

The processor 212, 222 may be configured to process instructions of a computer program by performing basic arithmetic operations, logic operations, and I/O operations. The computer-readable instructions may be provided from the memory 211, 221 or the communication interface 213, 223 to the processor 212, 222. For example, the processor 212, 222 may be configured to execute received instructions in response to the program code stored in the storage device, such as the memory 211, 221.

The communication interface 213, 223 may provide a function for communication between the electronic device 110 and the server 150 over the network 170 and may provide a function for communication between the electronic device 110 and/or the server 150 and another electronic device, for example, the electronic device 120 or another server, for example, the server 160. For example, the processor 212 of the electronic device 110 may forward a request created based on a program code stored in the storage device such as the memory 211, to the server 150 over the network 170 under control of the communication interface 213. Inversely, a control signal, an instruction, content, a file, etc., provided under control of the processor 222 of the server 150 may be received at the electronic device 110 through the communication interface 213 of the electronic device 110 by going through the communication interface 223 and the network 170. For example, a control signal, an instruction, content, a file, etc., of the server 150 received through the communication interface 213 may be forwarded to the processor 212 or the memory 211, and content, a file, etc., may be stored in a storage medium, for example, the permanent storage device, further includable in the electronic device 110.

The I/O interface 214 may be a device used for interface with an I/O apparatus 215. For example, an input device may include a device, such as a keyboard, a mouse, a microphone, a camera, etc., and an output device may include a device, such as a display, a speaker, a haptic feedback device, etc. As another example, the I/O interface 214 may be a device for interface with an apparatus in which an input function and an output function are integrated into a single function, such as a touchscreen. The I/O apparatus 215 may be configured as a single device with the electronic device 110. Also, the I/O interface 224 of the server 150 may be a device for interface with an apparatus (not shown) for input or output that may be connected to the server 150 or included in the server 150. In detail, when the processor 212 of the electronic device 110 processes an instruction of a computer program loaded to the memory 211, content or a service screen configured based on data provided from the server 150 or the electronic device 120 may be displayed on the display through the I/O interface 214.

According to other example embodiments, the electronic device 110 and the server 150 may include a number of components greater than or less than a number of components shown in FIG. 2. However, there is no need to clearly illustrate many components according to the related art. For example, the electronic device 110 may include at least a portion of the I/O apparatus 215, or may further include other components, for example, a transceiver, a global positioning system (GPS) module, a camera, a variety of sensors, a database (DB), and the like. In detail, if the electronic device 110 is a smartphone, the electronic device 110 may be configured to further include a variety of components, for example, an acceleration sensor, a gyro sensor, a camera module, various physical buttons, a button using a touch panel, an I/O port, a vibrator for vibration, etc., which are generally included in the smartphone.

Hereinafter, example embodiments of a method and system for displaying content of interest are described.

The term "community" used herein may encompass a communication space on the Internet such as a messenger and a social network service (SNS). For example, in addition to a chatroom between individual users, an openchat that allows a direct chat through a link, such as a uniform resource locator (URL), without a friend addition process using a telephone number and an ID, an official account that represents an account in a form of a bot providing various types of services or contents, and a space for sending and receiving messages may be included in a community. Without being limited thereto, any space in which persons with a common interest or environment may communicate through various communication functions, such as chats, posts, notes, and comments, may be expanded and thereby applied as the community.

Although the following description is made based on a messenger as an example, it is provided as an example only. Any community in which a user participation occurs based on an account or a telephone number of a user, and the like may apply.

Figure 3:
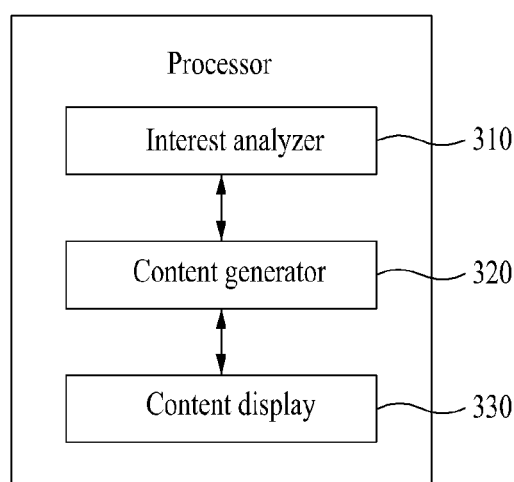
FIG. 3 is a diagram illustrating an example of components includable in a processor of an electronic device according to at least one example embodiment.
Figure 4:
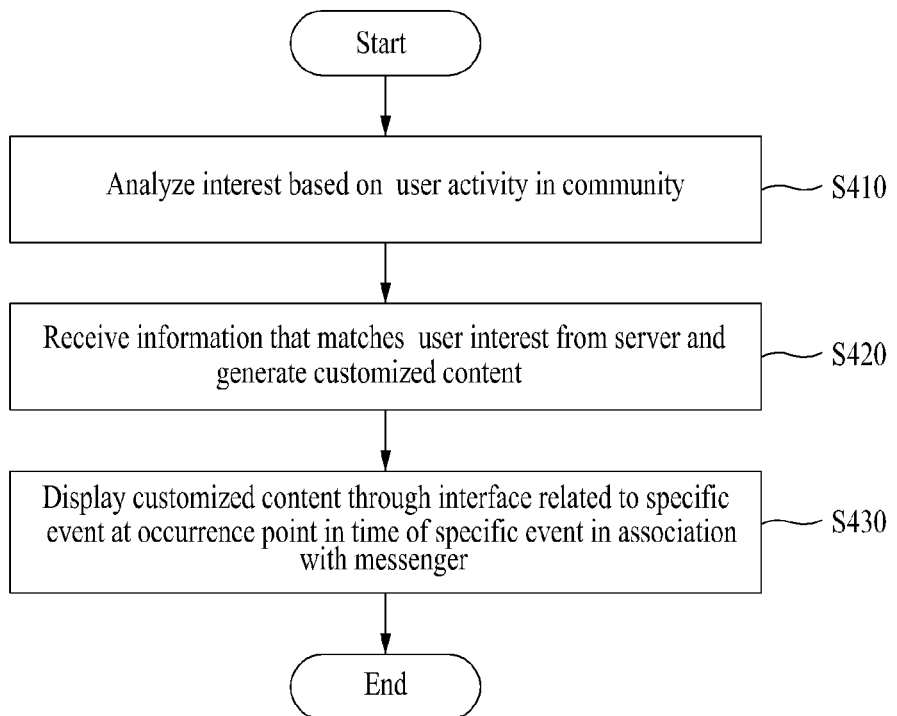
FIG. 4 is a flowchart illustrating an example of a method performed by an electronic device according to at least one example embodiment.

FIG. 3 is a diagram illustrating an example of components includable in a processor of an electronic device according to at least one example embodiment, and FIG. 4 is a flowchart illustrating an example of a method performed by an electronic device according to at least one example embodiment.

A computer-implemented content display system may be configured in the electronic device 110 according to the example embodiment. For example, the content display system may be configured in a form of a program that independently operates or may be configured in an in-app form of a specific application to be operable on the specific application.

The content display system implemented in the electronic device 110 may perform a content display method of FIG. 4 in response to an instruction provided from an application installed on the electronic device 110.

Referring to FIG. 3, to perform the content display method of FIG. 4, the processor 212 of the electronic device 110 may include an interest analyzer 310, a content generator 320, and a content display 330. Depending on example embodiments, the components of the processor 212 may be selectively included in or excluded from the processor 212. Also, depending on example embodiments, the components of the processor 212 may be separated or merged for representations of functions of the processor 212.

The processor 212 and the components of the processor 212 may control the electronic device 110 to perform operations S410 to S430 included in the content display method of FIG. 4. For example, the processor 212 and the components of the processor 212 may be configured to execute an instruction according to a code of at least one program and a code of an OS included in the memory 211.

Here, the components of the processor 212 may be representations of different functions of the processor 212 performed by the processor 212 in response to an instruction provided from the program code stored in the electronic device 110, for example, an instruction provided from the application executed on the electronic device 110. For example, the interest analyzer 310 may be used as a functional representation of the processor 212 that controls the electronic device 110 to verify a user interest in response to the instruction.

The processor 212 may read instructions from the memory 211 to the electronic device 110 based on the instructions. The instructions read from the memory 211 may cause the processor 212 to perform operations S410 to S430 in FIG. 4.

Referring to FIG. 4, in operation S410, the interest analyzer 310 may analyze an interest of a messenger user based on a user activity in a messenger. The interest analyzer 310 may verify a user interest by analyzing a user activity in a chatroom including a user as a community provided from the messenger or a user activity in another community interactable with the messenger. Depending on example embodiments, the interest analyzer 310 may select an official chatroom provided in a form of an open service, for example, an open chatroom and an official account chatroom, among chatrooms including the user and may analyze a user activity in the official chatroom. For example, the interest analyzer 310 may analyze a chatroom of interest of the user based on a message or a post written by the user in a corresponding chatroom, a ratio or a frequency of user responses to a total number of responses during a predetermined time period, a ratio of positive messages written by the user to the total number of responses during the predetermined time period, a duration of time in which the user stays in the chatroom, a ratio at which the user sends a specific type of a message, such as an image or a video, to the total number of responses during the predetermined time period, or a number of times that the user sends the specific type of messages. As another example, the interest analyzer 310 may analyze the user interest based on an activity of viewing content, a reaction (e.g., ratings such as "like"), and an activity of inputting a comment, in a corresponding chatroom. The interest analyzer 310 may analyze the user interest based on chat content (conversation content) in a chatroom including the user and a type or a category of the chatroom including the user. The interest analyzer 310 may analyze data related to the user activity in the messenger periodically or in real time and may extract at least one keyword indicating user interest information from an activity analysis result. The interest analyzer 310 may also analyze a common interest among all users included in the chatroom as well as an interest of an individual user.

In operation S420, the content generator 320 may receive information that matches the user interest from the server 150 related to the messenger and may generate customized content that includes the corresponding information. The content generator 320 may send, to the server 150, information about the user interest analyzed in operation S410 and may receive, from the server 150, data that includes content provider information or content information corresponding to the user interest. To provide the data that includes the content provider information or the content information corresponding to the user interest, the server 150 may match in advance a keyword to each of the content provider information and the content information. The server 150 may provide data that includes content provider information or content information matching a keyword verified as the user interest. The content generator 320 may download in advance data received from the server 150 as the customized content of the user or may generate the customized content in a specific format based on the data received from the server 150. For example, the content generator 320 may format a startup screen of a messenger application into the customized content based on the data received from the server 150. For example, the content generator 320 may customize the startup screen of the messenger application using an image or a video that matches the user interest. As another example, the content generator 320 may generate the customized content in a format providable in a chatroom, such as a pop-up screen and a link, based on the data received from the server 150. The format of the customized content is provided as an example only and any format displayable through an interface of the messenger may apply.

In operation S430, the content display 330 may display content generated in operation S420, that is, the customized content according to the user interest (hereinafter, content of interest) through an interface related to a specific even at an occurrence point in time of the specific event in association with the messenger.

For example, the content display 330 may display the content of interest on a messenger startup screen in a state in which the messenger application is active, that is, at a starting point in time at which the messenger application starts to run. The content display 330 may display the content of interest as the startup screen instead of displaying default content.

As another example, when a user activity in a messenger chatroom meets a specific condition, the content display 330 may display the content of interest in the corresponding chatroom. A variety of activities in the chatroom may be used as a condition to determine whether to display the content of interest. When the user enters a chatroom with a message unread by the user, and as a result, there are no unread messages left in the chatroom, the content display 330 may determine that a display condition for the content of interest is met. Also, when the user stays in the chatroom for a predetermined (or, alternatively, desired) period of time, the content display 330 may determine that the display condition for the content of interest is met. Also, when the user stays for a predetermined (or, alternatively, desired) period of time or more without exchanging messages with another user in the chatroom, the content display 330 may determine that the display condition for the content of interest is met. Also, when a chatroom entered by the user immediately after starting the messenger matches a chatroom in which the user stayed just before a previous termination of the messenger, the content display 330 may determine that the display condition for the content of interest is met. Also, when a specific type of activity or an activity above a desired ratio is detected as the user activity in the chatroom, the content display 330 may determine that the display condition for the content of interest is met. For example, when an activity of viewing content or an input of a positive rating reaction is present in the chatroom, the content display 330 may display the content of interest in the corresponding chatroom.

As another example, when a message (hereinafter, an interest message) including a keyword related to the user interest (or a common interest in the entire chatroom) is received in the chatroom, the content display 330 may display the content of interest in the corresponding chatroom. The keyword related to the user interest may include a keyword indicating the user interest, a related keyword having a relevance to the keyword indicating the user interest, and the like. When the interest message is received in the chatroom, the content display 330 may provide a user interface for a user selection input in association with the interest message. When the user selects the user interface related to the interest message, the content display 330 may display the content of interest through an individual window such as a pop-up in the chatroom.

As another example, when shared content matches the user interest in a process of sharing content such as a webpage between users included in the chatroom, the content display 330 may display the interest content as content related to the shared content. When the content matching the user interest is received through the chatroom, the content display 330 may provide a user interface in association with the corresponding content message. When the user selects the user interface related to the content message, the content display 330 may display the content of interest through an individual window, for example, a pop-up in the chatroom.

Therefore, when the user activity in the chatroom, such as displaying content of interest on the startup screen when starting the messenger or entering a chatroom with no unread messages, meets a specific content, the content display 330 may display the content of interest.

FIGS. 5 to 11 illustrate examples of a process of displaying content of interest in response to an occurrence of a specific event in association with a messenger according to at least one example embodiment.

Figure 5:
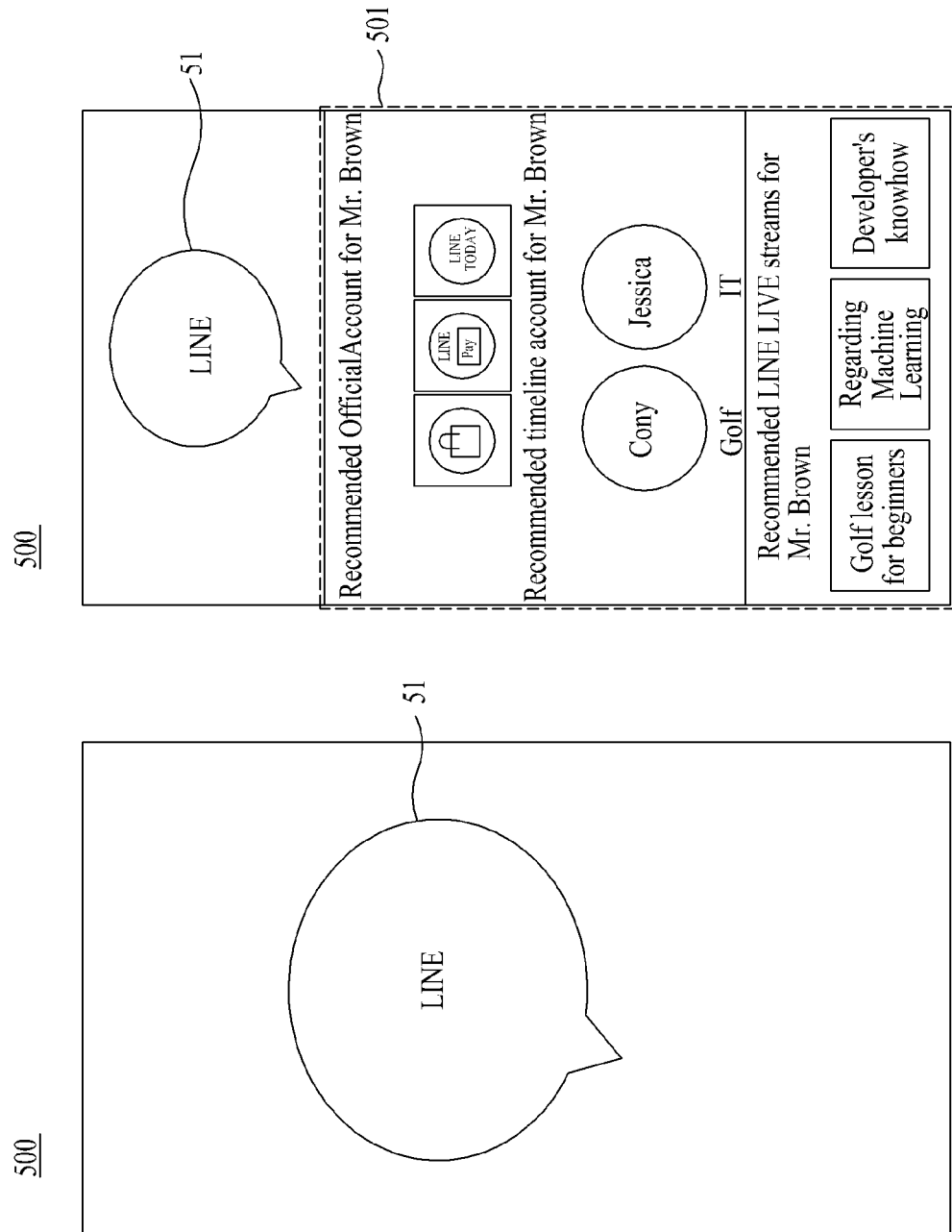
FIGS. 5 to 11 illustrate examples of a process of displaying content of interest according to at least one example embodiment.

Referring to FIG. 5, a messenger startup screen 500 may display a default content 51 when a user opens up a messenger application. The messenger start up screen may the first screen that is visible to the user when the messenger application is launched, and may be also referred to as "launch screen" or "splash screen." In an example embodiment of the present disclosure, when the messenger application is launched, the content display 330 may display a user's customized content as a content of interest 501, along with the default content 51, instead of only displaying the default content 51 on the messenger startup screen 500. Here, the content of interest 501 may include content information determined as the same topic as a user interest and/or content provider information about the messenger or other services related to the user interest.

Therefore, the content display 330 may format the messenger startup screen 500 to include the content of interest 501 that is customized to reflect the user interest.

Figure 6:
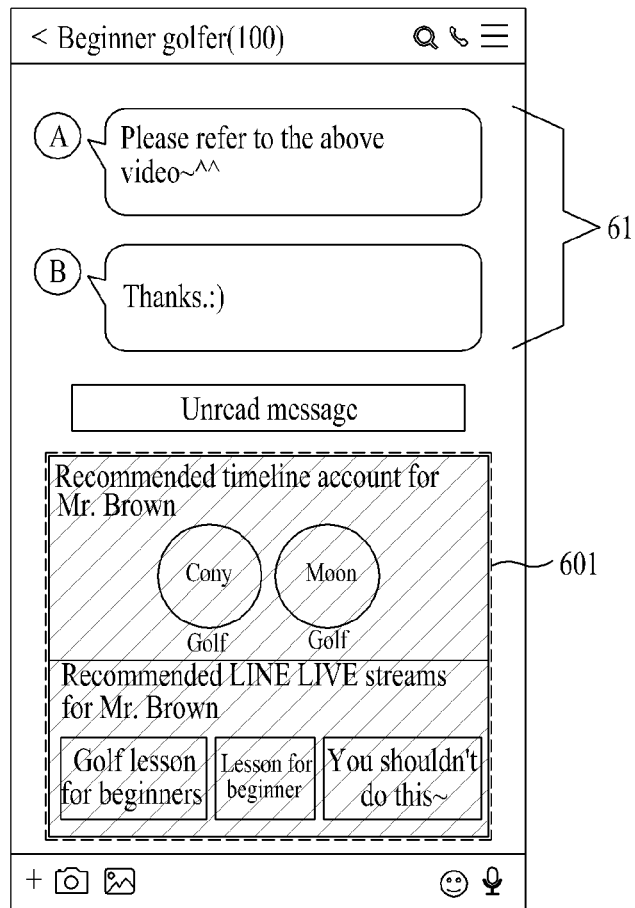

Referring to FIG. 6, the content display 330 may determine whether there exists an unread message that is not processed as being read in a chatroom 600 at the time when the user enters the chatroom 600, and when the unread message is absent, may determine that a display condition of content of interest 601 is met. In response to an event of entering a specific chatroom, for example, the chatroom 600, the content display 330 may determine whether all of messages 61 included in the chatroom 600 are processed. When all of the messages 61 included in the chatroom 600 are processed as being read and there are no unread messages at the time of a user entry request, the content display 330 may display the content of interest 601 in the corresponding chatroom 600. Here, the content display 330 may select content related to the chatroom 600 from among contents related to the user interest and may display the selected content as the content of interest 601. For example, when "golf" and "IT" are determined as user interests and when a chatroom in which the content of interest 601 is to be displayed is related to "golf" that is one of the user interests (e.g., when the chatroom is an open chatroom classified into a "golf" or "sports" category), the content display 330 may display only content related to the corresponding interest "golf" as the content of interest 601.

For example, the content display 330 may process and display the content of interest 601 in a message format (e.g., using a chat bubble or a message bubble) to cause the content of interest 610 to appear as one of the messages exchanged in the chatroom 600.

Figure 7:
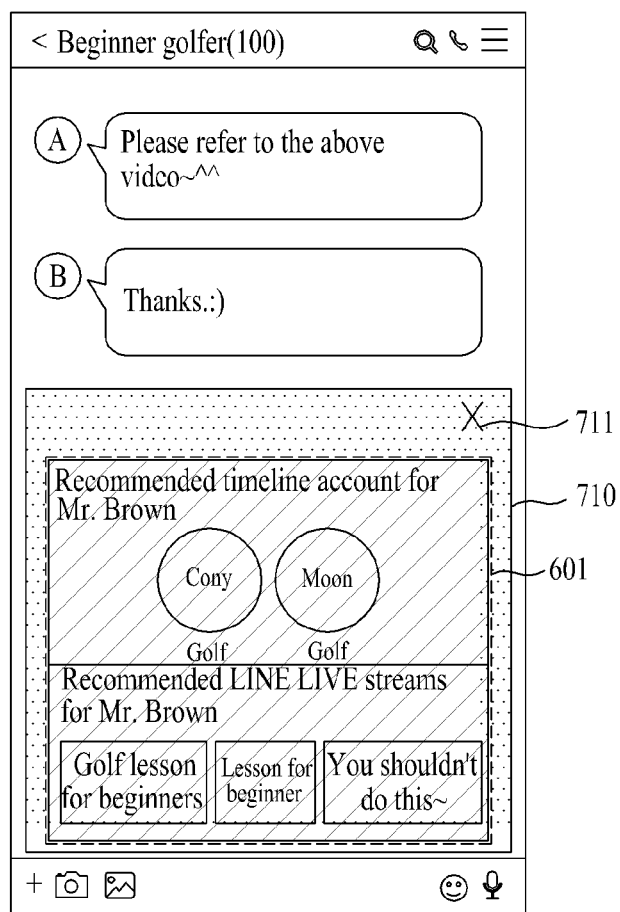

As another example, referring to FIG. 7, the content display 330 may display the content of interest 601 through a separate content screen 710, such as a pop-up displayable in the chatroom 600 and at least a partial screen on the chatroom 600. A close button 711 for the user to selectively close a screen may be included in the content screen 710.

Therefore, when the user enters the chatroom 600 with no unread messages, the content display 330 may display the content of interest 601 through the chatroom 600.

Figure 8:
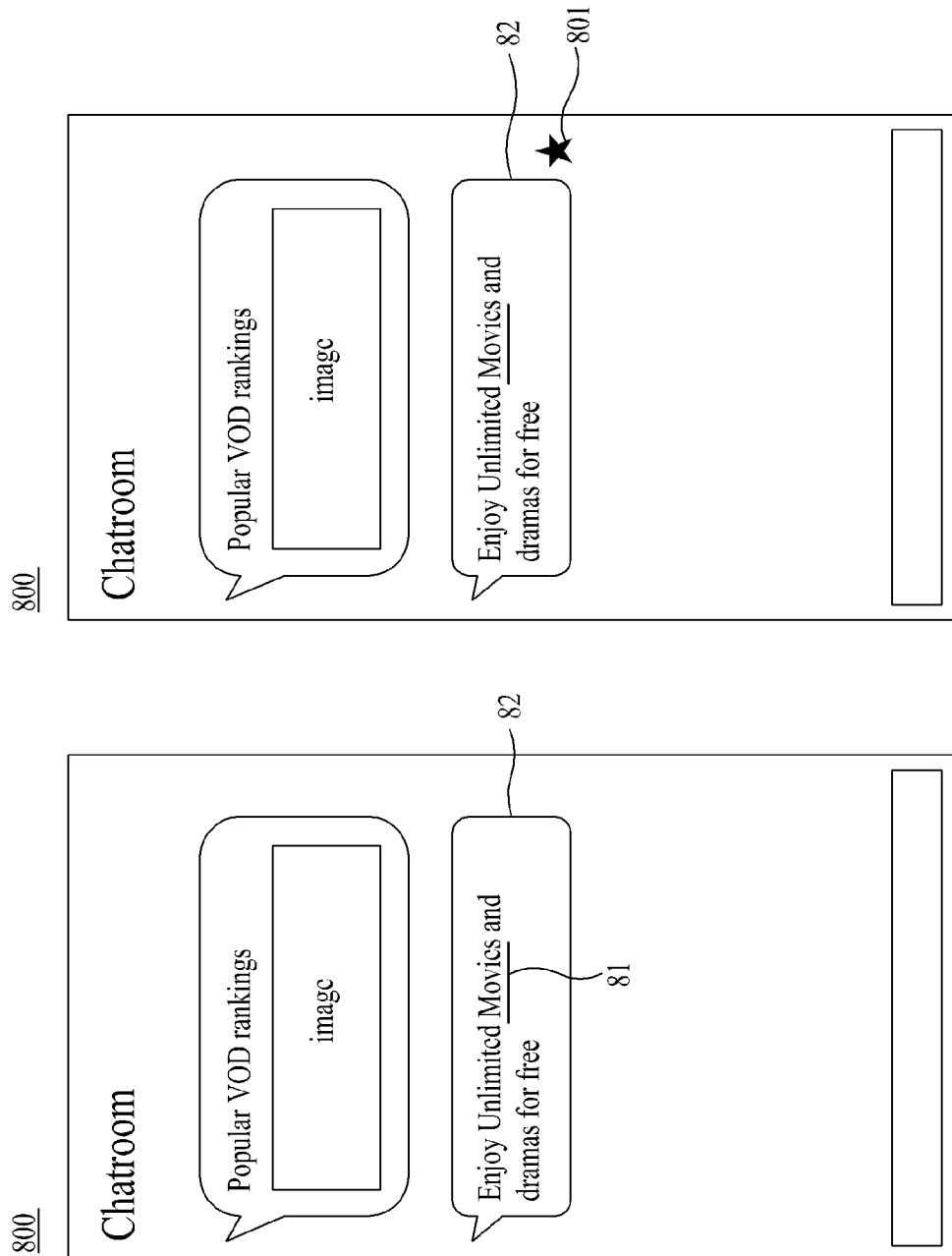

Referring to FIG. 8, when an interest message 82 including a keyword (e.g., "movie") 81 verified as a user interest or a common interest in the entire chatroom 800 is received in the chatroom 800, the content display 330 may display an interest user interface 801 as an icon representing the interest message 82 at a location adjacent to the interest message 82. Since each user has a different interest, the interest user interface 801 may not be displayed although the same message is received.

Figure 9:
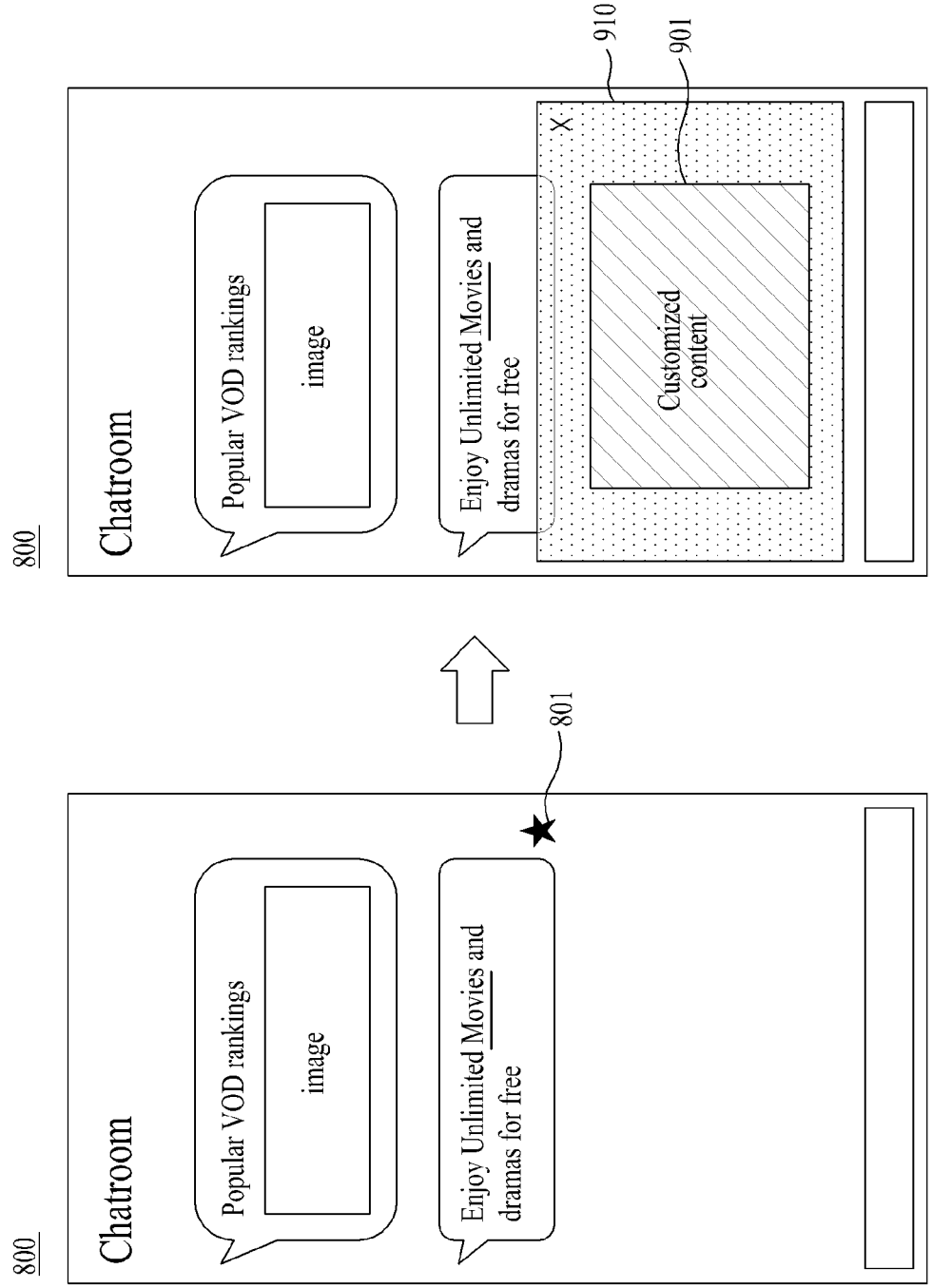

Referring to FIG. 9, when the user selects the interest user interface 801 in the chatroom 800, the content display 330 may display content of interest 901 through a separate content screen 910 such as a pop-up displayable in the chatroom 800.

In addition to displaying the content of interest 901 using the content screen 910, the content display 330 may also display the content of interest 901 in a content message type included in the chatroom 800.

Therefore, when the interest message 82 including the keyword 81 verified as the user interest or the common interest in the chatroom 800 is received in the chatroom 800, the content display 330 may display the content of interest 901 through the corresponding chatroom 800.

Enhanced user experience may be provided by providing customized additional information in response to a selection from the user using the interest user interface 801.

Figure 10:
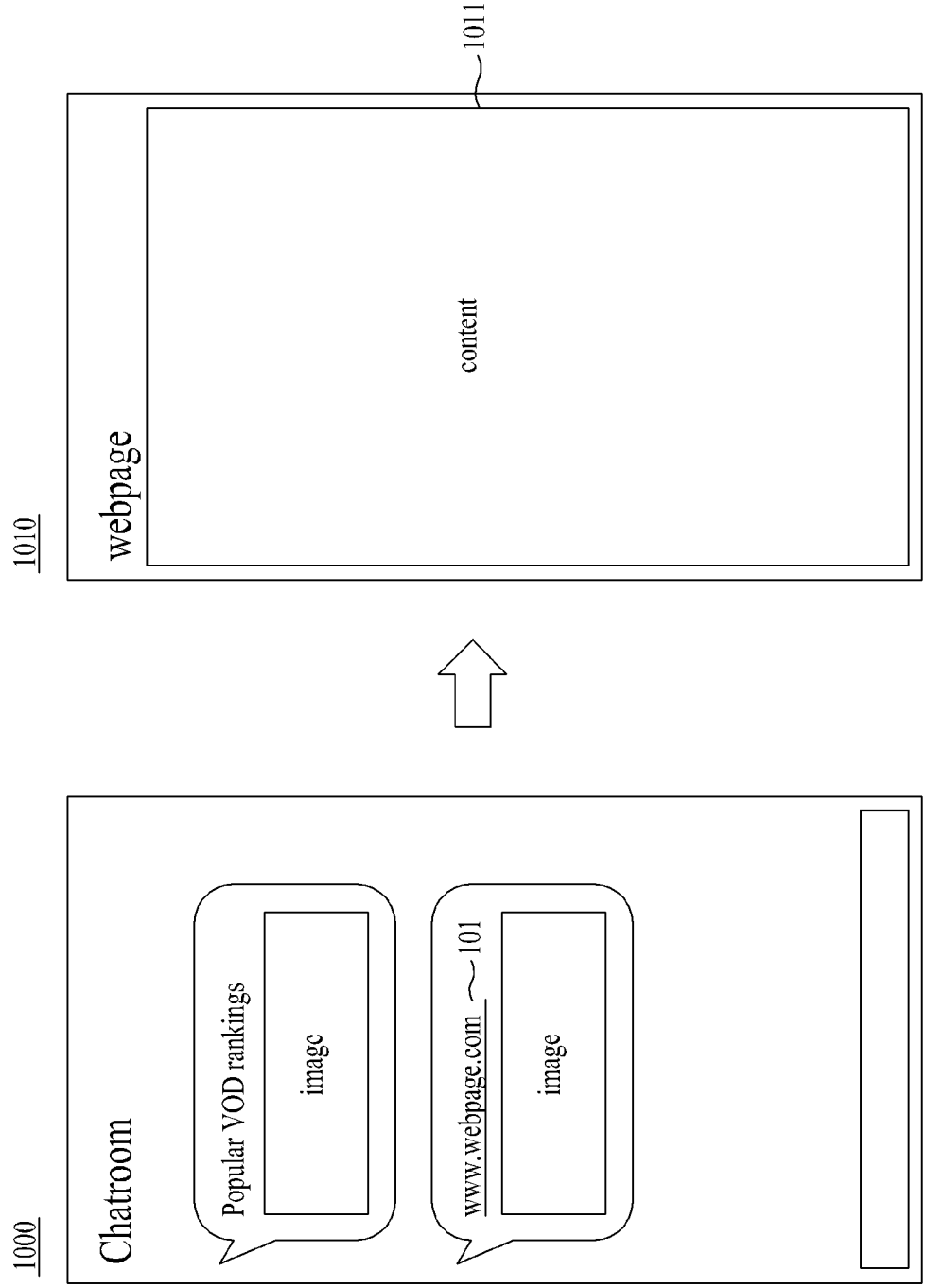

Referring to FIG. 10, when a webpage 1010 including content 1011 on a web, such as a video and an article, is shared through a link 101 in a chatroom 1000, the content display 330 may verify whether content matching a user interest is present among the contents 1011 in the webpage 1010. When the content matching the user interest is determined to be present among the contents 1011 in the webpage 1010, the content display 330 may display a message including the link 101 of the webpage 1010 to be differentiated from a case in which the content matching the user interest is determined to be absent among the contents 1011 in the webpage 1010.

Figure 11:
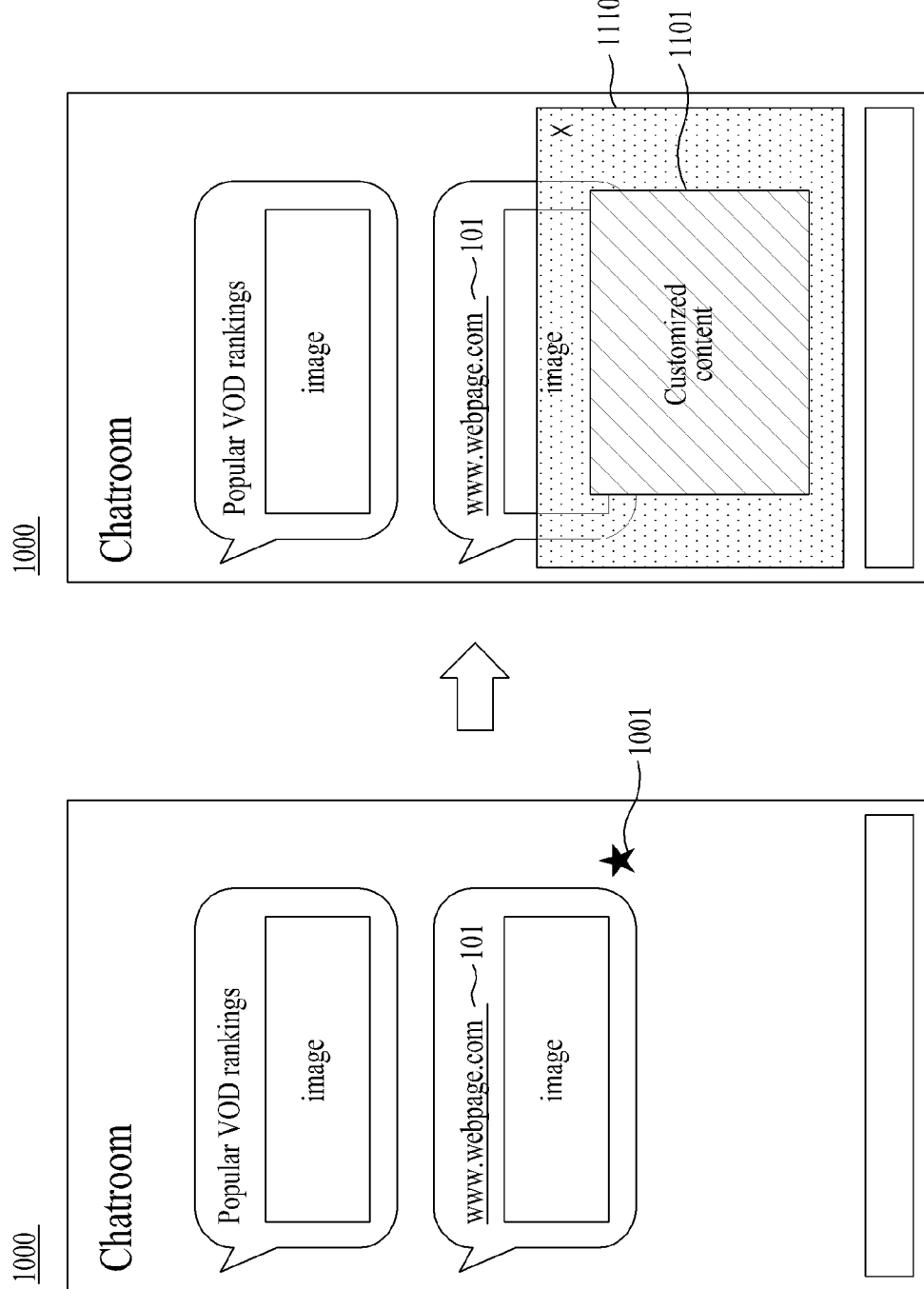

Referring to FIG. 11, when the content matching the user interest is present in the webpage 1010 shared through the chatroom 1000, the content display 330 may display an interest user interface 1001 for a message included in the link 101.

When the user selects the interest user interface 1001 in the chatroom 1000, the content display 330 may display content of interest 1101 as content related to the webpage 1010 through a separate content screen 1110, such as a pop-up displayable in the chatroom 1000.

In addition to displaying the content of interest 1101 using the content screen 1110, the content display 330 may display the content of interest 1101 as a content message type included in the chatroom 1000.

Therefore, when shared content matches the user interest in a process of sharing content such as a webpage between users included in the chatroom 1000, the content display 330 may display the content of interest 1101 as content related to the shared content.

As described above, according to some example embodiments, it is possible to display customized content according to a user interest at an occurrence point in time of a specific event in association with a community application such as a messenger.

The systems or the apparatuses described herein may be implemented using hardware components, software components, and/or a combination thereof. For example, the apparatuses and the component described herein may be implemented using one or more general-purpose or special purpose computers, such as, for example, a processor, a controller, an arithmetic logic unit (ALU), a digital signal processor, a microcomputer, a field programmable gate array (FPGA), a programmable logic unit (PLU), a microprocessor, or any other device capable of responding to and executing instructions in a defined manner. A processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciate that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combinations thereof, for independently or collectively instructing or configuring the processing device to operate as desired. Software and/or data may be embodied permanently or temporarily in any type of machine, component, physical equipment, a computer record medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable record mediums.

The methods according to the above-described example embodiments may be configured in a form of program instructions performed through various computer devices and recorded in non-transitory computer-readable media. The media may continuously store computer-executable programs or may temporarily store the same for execution or download. Also, the media may be various types of recording devices or storage devices in a form in which one or a plurality of hardware components are combined. Without being limited to media directly connected to a computer system, the media may be distributed over the network. Examples of the media include magnetic media such as hard disks, floppy disks, and magnetic tapes; optical media such as CD-ROM and DVDs; magneto-optical media such as floptical disks; and hardware devices that are specially configured to store and perform program instructions, such as ROM, RAM, flash memory, and the like. Examples of other media may include recording media and storage media managed by an app store that distributes applications or a site, a server, and the like that supplies and distributes other various types of software.

The foregoing embodiments are merely examples and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A content display method implemented by a computer system including at least one processor configured to execute computer-readable instructions included in a memory, the content display method comprising:

analyzing a user interest based on a user activity on an application;

generating a customized content in response to receiving from a server, information that matches the user interest; and displaying the customized content through a specific chatroom, among a plurality of chatrooms of the application, when a predetermined type of activity is detected or the predetermined type of activity occurs at a predetermined rate or higher on the application.

2. The content display method of claim 1, wherein the displaying comprises: displaying the customized content on a launch screen of the application when the application starts to run.

3. The content display method of claim 1, wherein the displaying comprises: displaying the customized content through a chatroom of the application when the user activity in the chatroom meets a specific condition.

4. The content display method of claim 1, wherein the displaying comprises: displaying the customized content through a chatroom of the application when a user enters the chatroom with no unread messages.

5. The content display method of claim 1, wherein the displaying comprises: displaying the customized content through a chatroom of the application when a user stays for a predetermined period of time or longer without sending a message in the chatroom.

6. The content display method of claim 1, wherein the displaying comprises: in response to receiving a message including a keyword related to the user interest through a chatroom of the application, displaying an interface for receiving a selection input in association with the message; and displaying the customized content through the chatroom when a user selects the interface.

7. The content display method of claim 1, wherein the displaying comprises: displaying an interface for receiving a selection input in association with a content, in response to the content shared through a chatroom of the application matching the user interest; and displaying the customized content through the chatroom when a user selects the interface.

8. The content display method of claim 1, wherein the generating the customized content comprises: receiving, from the server, data that includes content provider information or content information corresponding to the user interest; and generating the customized content in a chatroom message format of the application using the data.

9. A non-transitory computer-readable record medium storing instructions that, when executed by a processor, cause the processor to perform a content display method comprising:

analyzing a user interest based on a user activity on an application; generating a customized content in response to receiving from a server, information that matches the user interest; and displaying the customized content through a specific chatroom, among a plurality of chatrooms of the application, when a predetermined type of activity is detected or the predetermined type of activity occurs at a predetermined rate or higher, an on the application.

10. A computer system comprising: a memory storing one or more computer-readable instructions; and at least one processor configured to execute the computer-readable instructions to: analyze a user interest based on a user activity on an application;

generate a customized content in response to receiving from a server, information that matches the user interest; and display the customized content through a specific chatroom, among a plurality of chatrooms of the application, when a predetermined type of activity is detected or the predetermined type of activity occurs at a predetermined rate or higher, on the application.

11. The computer system of claim 10, wherein the at least one processor is further configured to display the customized content on a launch screen of the application when the application starts to run.

12. The computer system of claim 10, wherein the at least one processor is further configured to display the customized content through a chatroom of the application when the user activity in the chatroom meets a specific condition.

13. The computer system of claim 10, wherein the at least one processor is further configured to display the customized content through a chatroom of the application when a user enters the chatroom with no unread messages.

14. The computer system of claim 10, wherein the at least one processor is further configured to display the customized content through a chatroom of the application when a user stays for a predetermined period of time or longer without sending a message in the chatroom.

15. The computer system of claim 10, wherein the at least one processor is further configured to, in response to receiving a message including a keyword related to the user interest through a chatroom of the application, display an interface for receiving a selection input in association with the message, and display the customized content through the chatroom when a user selects the interface.

16. The computer system of claim 10, wherein the at least one processor is further configured to display an interface for receiving a selection input in association with a content, in response to the content shared through a chatroom of the application matching the user interest, and display the customized content through the chatroom when a user selects the interface.

* * * * *